(12) United States Patent
Fynbo

(10) Patent No.: US 11,197,565 B2
(45) Date of Patent: Dec. 14, 2021

(54) FLEXIBLE MAT ANCHOR AND TETHER SYSTEM AND METHOD

(71) Applicant: Busy Baby LLC, Oronoco, MN (US)

(72) Inventor: Beth Fynbo, Oronoco, MN (US)

(73) Assignee: Busy Baby LLC, Oronoco, MN (US)

( * ) Notice: Subject to any disclaimer, the term of this patent is extended or adjusted under 35 U.S.C. 154(b) by 0 days.

(21) Appl. No.: 17/207,017

(22) Filed: Mar. 19, 2021

(65) Prior Publication Data

US 2021/0204734 A1 Jul. 8, 2021

Related U.S. Application Data

(63) Continuation of application No. 16/793,251, filed on Feb. 18, 2020, which is a continuation-in-part of application No. 16/676,365, filed on Nov. 6, 2019, now Pat. No. 10,674,850, which is a continuation of application No. 16/284,898, filed on Feb. 25, 2019, now Pat. No. 10,470,599.

(60) Provisional application No. 62/725,169, filed on Aug. 30, 2018, provisional application No. 62/655,973, filed on Apr. 11, 2018.

(51) Int. Cl.
*A47G 23/03* (2006.01)
*F16B 47/00* (2006.01)

(52) U.S. Cl.
CPC ..... *A47G 23/0303* (2013.01); *A47G 23/0306* (2013.01); *A47G 23/0316* (2013.01); *F16B 47/00* (2013.01)

(58) Field of Classification Search
CPC .............. A47G 23/0303; A47G 29/087; A47G 23/0306; A47G 23/0316; A47G 19/10; A63H 33/006; A61J 17/1115; A47D 15/006; B60N 2/26; F16B 47/00
See application file for complete search history.

(56) References Cited

U.S. PATENT DOCUMENTS

| | | | | |
|---|---|---|---|---|
| 4,416,438 A | * | 11/1983 | King | A61J 9/06 248/102 |
| 4,756,497 A | * | 7/1988 | Lan | A47G 23/03 220/630 |
| 4,765,037 A | * | 8/1988 | Perry | A61J 17/00 24/301 |
| 4,813,641 A | * | 3/1989 | Wilson | D06F 58/04 248/206.2 |

(Continued)

*Primary Examiner* — Hanh V Tran
(74) *Attorney, Agent, or Firm* — Headland Law & Strategy; Matthew J. Smyth

(57) ABSTRACT

In some embodiments, a method includes providing a flexible mat; wrapping the flexible mat around a crossbar of an infant or toddler seat; affixing at least two of a plurality of suction cups; providing a tether configured to secure an object; and coupling the tether to an anchor block by disposing an anchor terminus through an aperture, forming a compression fit. The flexible mat may have a mat body characterized by a front side, back side and thickness; and a plurality of anchors. Each anchor may include an anchor block having an aperture configured to receive a tether, and a suction cup. Each anchor may be disposed through the thickness, such that its anchor block is on the front side and its suction cup extends from the back side. The back side may be adjacent a surface of the crossbar. The method may include securing an object to the tether.

21 Claims, 15 Drawing Sheets

(56) References Cited

U.S. PATENT DOCUMENTS

| | | | | |
|---|---|---|---|---|
| 4,881,746 | A * | 11/1989 | Andreesen | A63H 33/006 280/33.992 |
| 4,903,698 | A * | 2/1990 | Huber | A61J 17/111 606/235 |
| 4,994,075 | A * | 2/1991 | Smith | A61J 17/00 606/235 |
| 5,053,262 | A * | 10/1991 | Kerr | A47G 23/0303 428/81 |
| 5,425,546 | A * | 6/1995 | Gerber | B62B 3/1428 108/44 |
| 5,611,511 | A * | 3/1997 | Lee | F16B 47/00 248/205.5 |
| 5,697,888 | A * | 12/1997 | Kobayashi | A61B 1/015 600/159 |
| 5,715,571 | A * | 2/1998 | Fasano | B62B 3/144 16/436 |
| 5,722,672 | A * | 3/1998 | Frederick | B62B 5/06 280/33.992 |
| 5,762,305 | A * | 6/1998 | Lee | A45B 11/00 248/205.5 |
| 5,820,142 | A * | 10/1998 | Duer | B62B 5/069 280/33.992 |
| 5,911,394 | A * | 6/1999 | Lee | F16B 47/00 248/205.8 |
| 6,139,149 | A * | 10/2000 | Shafer | A61H 5/00 351/203 |
| 6,746,735 | B2 * | 6/2004 | Snedeker | A47G 19/10 248/346.01 |
| 7,661,636 | B1 * | 2/2010 | Burke | B60N 2/2845 248/102 |
| 7,850,133 | B2 * | 12/2010 | Carnevali | F16B 47/00 248/205.5 |
| 8,763,181 | B1 * | 7/2014 | Penfold | A47G 23/0306 5/655 |
| 8,955,710 | B2 * | 2/2015 | Dotson | B65F 1/141 220/630 |
| 10,966,557 | B1 * | 4/2021 | Gieck | A47G 29/087 |
| 2002/0027382 | A1 * | 3/2002 | Bellows | A63H 33/00 297/135 |
| 2003/0014078 | A1 * | 1/2003 | Robbins | A61J 17/02 606/235 |
| 2003/0227202 | A1 * | 12/2003 | Endicott | B62B 3/1456 297/256.17 |
| 2004/0154099 | A1 * | 8/2004 | Waters | A63H 3/02 5/424 |
| 2005/0036715 | A1 * | 2/2005 | Delaney | A47D 15/003 383/4 |
| 2005/0069658 | A1 * | 3/2005 | Minurri | B29C 66/1122 428/34.1 |
| 2006/0006181 | A1 * | 1/2006 | Rich | A47G 19/10 220/574 |
| 2007/0023594 | A1 * | 2/2007 | Choi | F16B 47/00 248/205.5 |
| 2008/0084099 | A1 * | 4/2008 | Palgon | A47C 31/11 297/219.12 |
| 2008/0167683 | A1 * | 7/2008 | Rodriguez | A61J 17/02 606/235 |
| 2008/0187709 | A1 * | 8/2008 | Hester | A47G 23/0306 428/99 |
| 2008/0245947 | A1 * | 10/2008 | Webb | A47G 19/10 248/683 |
| 2009/0211123 | A1 * | 8/2009 | Arnold | F16B 47/00 40/1 |
| 2010/0176626 | A1 * | 7/2010 | Centracco | A47D 1/006 297/136 |
| 2010/0181458 | A1 * | 7/2010 | Liu | F16B 47/00 248/363 |
| 2010/0264285 | A1 * | 10/2010 | Buelna | B60P 7/0807 248/205.8 |
| 2011/0017412 | A1 * | 1/2011 | Macneil | F16B 47/00 160/370.21 |
| 2011/0036745 | A1 * | 2/2011 | Seter | A47G 19/10 206/565 |
| 2011/0117808 | A1 * | 5/2011 | Fair | B62B 3/1456 446/227 |
| 2011/0156455 | A1 * | 6/2011 | Fair | A63H 33/006 297/188.01 |
| 2011/0232102 | A1 * | 9/2011 | Holmes | A47G 23/06 30/123 |
| 2012/0083842 | A1 * | 4/2012 | Barton | A61J 17/02 606/235 |
| 2012/0227678 | A1 * | 9/2012 | Milani | A01K 1/04 119/712 |
| 2012/0228187 | A1 * | 9/2012 | Pharr | A47G 23/06 206/557 |
| 2012/0305509 | A1 * | 12/2012 | Benson | F16M 13/022 211/85.7 |
| 2012/0316604 | A1 * | 12/2012 | Thrush | A61J 17/109 606/235 |
| 2013/0075563 | A1 * | 3/2013 | Tsai | F16B 47/00 248/309.3 |
| 2014/0299608 | A1 * | 10/2014 | Melo | A47G 11/004 220/574.1 |
| 2014/0370778 | A1 * | 12/2014 | Sinclair-Nitschke | A63H 33/006 446/227 |
| 2015/0224032 | A1 * | 8/2015 | Dierker | A41B 13/04 606/236 |
| 2015/0342382 | A1 * | 12/2015 | D'Alesio | A47G 23/0216 220/739 |
| 2015/0367759 | A1 * | 12/2015 | Grey | A63H 33/006 297/183.7 |
| 2016/0008231 | A1 * | 1/2016 | Peck | A61J 17/00 24/3.1 |
| 2016/0031585 | A1 * | 2/2016 | Rhinerson | B65D 1/34 206/457 |
| 2016/0325197 | A1 * | 11/2016 | Smith | A47G 23/0608 |
| 2017/0064854 | A1 * | 3/2017 | Hayes | A45C 13/10 |
| 2017/0202281 | A1 * | 7/2017 | Passaretti | A41D 19/01 |
| 2017/0209004 | A1 * | 7/2017 | Jackson | A47K 3/001 |
| 2017/0215610 | A1 * | 8/2017 | Cohen | A47G 23/0303 |
| 2017/0258689 | A1 * | 9/2017 | Drysdale | A41D 19/002 |
| 2018/0071650 | A1 * | 3/2018 | Reese | A63H 33/006 |
| 2019/0098964 | A1 * | 4/2019 | Gaddy | A44B 13/0029 |
| 2020/0008586 | A1 * | 1/2020 | Singh | B62B 3/144 |

* cited by examiner

FLEXIBLE MAT ANCHOR AND TETHER SYSTEM AND METHOD

CROSS-REFERENCE TO RELATED APPLICATIONS

This application is a continuation of U.S. patent application Ser. No. 16/793,251, titled "Flexible Mat Anchor and Tether System and Method," filed on Feb. 18, 2020; which is a continuation-in-part of U.S. patent application Ser. No. 16/676,365, titled "Placemat Anchor and Tether System," filed on Nov. 6, 2019, now U.S. Pat. No. 10,674,850; which is a continuation of U.S. patent application Ser. No. 16/284,898, titled "Placemat Anchor and Tether System," filed on Feb. 25, 2019, now U.S. Pat. No. 10,470,599; which claims the benefit of U.S. Provisional Application Ser. No. 62/725,169, titled "Placemat Anchor and Tether System," filed on Aug. 30, 2018; and U.S. Provisional Application Ser. No. 62/655,973, titled "Placement and Tether System," filed on Apr. 11, 2018. This application incorporates the entire contents of the foregoing applications herein by reference.

TECHNICAL FIELD

Various embodiments relate generally to systems for providing individuals with clean surfaces and means for anchoring items close to the individuals.

BACKGROUND

Young children, particularly infants and toddlers, tend to touch everything they can reach as they develop tactile functionality and explore the world around them. Parents often attempt to provide safe things for their baby to touch, chew on as they teethe, and generally play with, but often these items end up being dropped or tossed during the initial investigation. In many settings, this can be troublesome for parents as they must constantly pick things up off the ground and return them to the baby. In addition, dropped objects can collect and pass germs to the baby. Babies and toddlers are also learning how to move their bodies effectively for transportation, but early on, they do not have the coordination to do this smoothly and often tip over or fall when they are trying to reach for something that is out of reach.

Managing young children can be especially challenging for a caregiver when utensils, cups, bowls and other objects within reach of the child are mishandled and accidentally dropped, or, during certain phases of child development, intentionally and repeatedly thrown to the ground. To keep a child occupied, the caregiver may provide toys and other items of interest, which may also end up being dropped or repeatedly tossed to the ground, thus placing demands on the caregiver particularly in social situations, such as in restaurant settings.

SUMMARY

Described herein is a placemat and tether system that can provide a toddler with both a clean surface for food and toys, and a tether system for anchoring such toys or eating utensils close to the toddler. This system can protect the toddler from germs on a surrounding surface (e.g., a tabletop at a restaurant), and it can prevent tethered toys or utensils from being thrown onto the ground—thereby minimizing germ exposure and distractions to a caregiver who may otherwise need to constantly retrieve toys or utensils that are flung onto the floor or out of reach by the toddler.

In some embodiments a method may comprise providing a flexible mat; wrapping the flexible mat around a crossbar associated with a seat for a toddler or infant, wherein the back side may be adjacent a surface of the crossbar; affixing at least two of a plurality of suction cups to each other; providing an elongated tether; and coupling the elongated tether to an anchor block. The flexible mat may have a mat body characterized by a front side, a back side and a thickness and a plurality of anchors. Each anchor may comprise an anchor block have an aperture which may be characterized by an aperture diameter, and a suction cup. Each anchor block may be on the front side and its suction cup may extend from the back side. In some embodiments, the crossbar may comprise a shopping cart handle, a highchair safety bar, or a handle of an infant car seat or baby carrier.

In some embodiments, the elongated tether may comprise an anchor end. The anchor end may have an anchor terminus characterized by an anchor diameter that is greater than the aperture diameter. The elongated tether may comprise a compressible material. In some embodiments, the elongated tether may be coupled to one of the anchor blocks by disposing the anchor terminus through the aperture to form a compression fitting. In some embodiments, the elongated tether may comprise a retention end. The retention end may comprise one or more retention apertures, each which may be characterized by a retention-aperture diameter, and a retention terminus characterized by a retention diameter. The retention diameter may be greater than the retention-aperture diameter.

In some embodiments, the method may further comprise coupling an object to the elongated tether by disposing the elongated tether around or through the object and disposing the retention terminus through one of the one or more retention apertures. The object may comprise a pacifier, a toy, a cup, a stuffed animal, or a marker.

In some embodiments, a method may comprise providing a flexible mat having a mat body and a plurality of anchors, each anchor having an anchor block that may be configured to receive a tether, and a suction cup; wrapping the flexible mat around a crossbar associated with a seat for an infant or toddler, wherein the back side may be adjacent a surface of the crossbar; affixing at least one of a plurality of suction cups to the back side or to another suction cup; providing a tether configured to secure an object; and coupling the tether to one of the anchor blocks and securing an object to the tether. The mat body may be characterized by a front side, a back side and a thickness. Each anchor may be disposed through the thickness, such that its anchor block is on the front side and its suction cup extends from the back side. The object may comprise a pacifier, a toy, a cup, a stuffed animal, or a marker.

In some embodiments, the method may further comprise placing a toddler or infant in the seat and providing the object to the toddler or infant to occupy him or her. In some embodiments, wrapping the flexible mat around the crossbar may comprise covering the surface, which surface would otherwise be contactable by the toddler or infant.

In some embodiments, a method may comprise providing a flexible mat having a mat body and a plurality of anchors, each anchor having an anchor block that may be configured to receive a tether, and a suction cup; wrapping the flexible mat around a structural member; and affixing at least one of the plurality of suction cups to the back side or to another of the plurality of suction cups. The mat body may be characterized by a front side, a back side and a thickness. Each anchor block may be on the front side and each suction cup may extend from the back side. In some embodiments, the structural member may comprise an appliance handle, a stroller component, a furniture component, or a bathtub railing.

In some embodiments, the method may further comprise providing a tether that is configured to secure an object, and coupling the tether to one of the anchor blocks. In some embodiments, the tether may comprise an anchor end. The anchor end may have an anchor terminus characterized by an anchor diameter that is greater than a diameter of the aperture. The elongated tether may comprise a compressible material. In some embodiments, the tether may comprise a retention end. The retention end may comprise one or more retention apertures, each which may be characterized by a retention-aperture diameter, and a retention terminus characterized by a retention diameter. The retention diameter may be greater than the retention-aperture diameter.

In some embodiments, the method may further include securing an object to the tether. The object may comprise a pacifier, a toy, a cup, a stuff animal, or a marker. In some embodiments, the structural member may be associated with a seat for a toddler or infant, and the method may further comprise placing a toddler or infant in the seat. The tether may be provided as a means to occupy the toddler or infant. In some embodiments, wrapping the flexible mat around the structural member may comprise covering the surface, which surface would otherwise be contactable by the toddler or infant.

DETAILED DESCRIPTION

Described herein is a placemat and tether system that can provide a toddler with both a clean surface for food and toys, and a tether system for anchoring such toys or eating utensils close to the toddler. This system can protect the toddler from germs on a surrounding surface (e.g., a tabletop at a restaurant), and it can prevent tethered toys or utensils from being thrown onto the ground—thereby minimizing germ exposure and distractions to a caregiver who may otherwise need to constantly retrieve toys or utensils that are flung onto the floor or out of reach by the toddler.

This system can, for example, provide benefit for users in a restaurant setting. As another example, a caregiver may use the placemat and tether system to anchor bath toys adjacent a baby bath tub to keep the toys within reach of a baby just learning to grasp objects. As another example, a caregiver for an adult patient suffering from a motor control or movement disorder may use the system to tether eating utensils in a manner that keeps them within the patient's reach, to provide the patient with a more satisfying and independent eating experience.

Figure 1A:
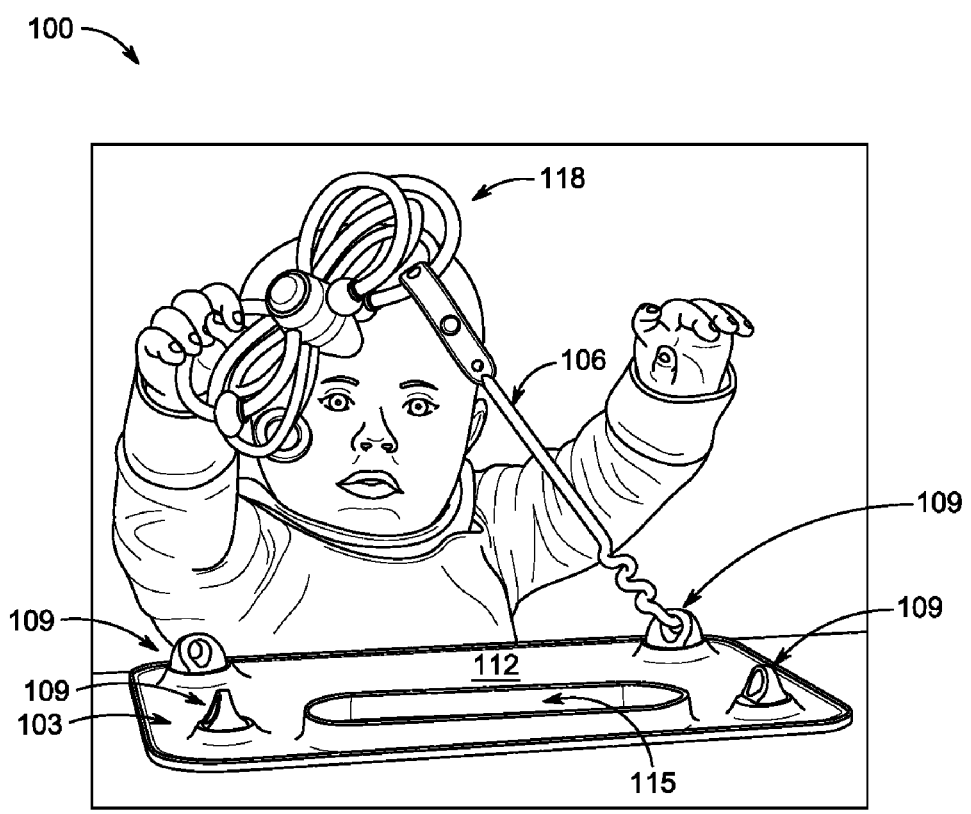
FIG. 1A is a perspective view of a placemat and tether system in use by a young child.
Figure 1B:
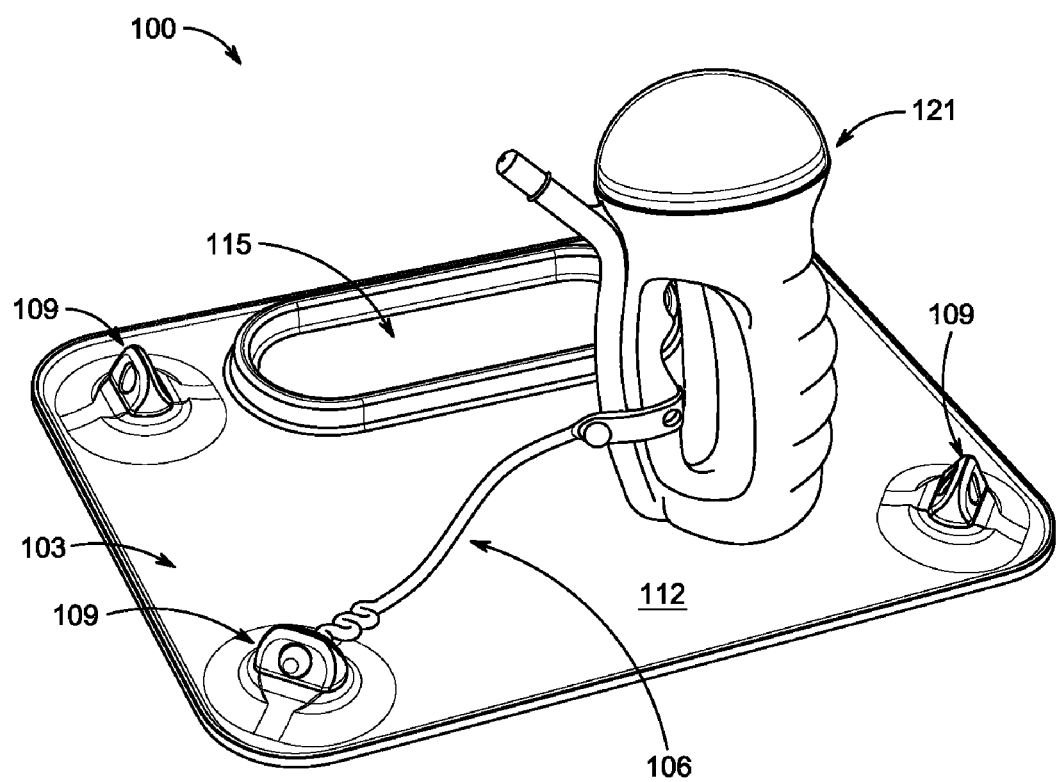
FIG. 1B is a perspective view of a placement and tether system used to secure an object.

FIGS. 1A and 1B illustrate an exemplary placemat and tether system 100 in use. In this embodiment, the system 100 comprises a placemat 103 and an elongated tether 106. The placemat 103 comprises a plurality of anchors 109 that each can include a means for retaining the elongated tether 106 and a means for affixing the placemat to a surface or substrate such as a table. Exemplary anchors are described in more detail with reference to FIGS. 3A-C and FIGS. 4A, B.

The placemat 103 provides an easily cleanable front surface 112 and can include one or more receptacles, such as receptacle 115, which can be used for containing food items or other objects. A toy 118, cup 121 or other utensil can be secured to an end of the elongated tether 106 opposite the end that is secured to an anchor 109.

Figure 2A:
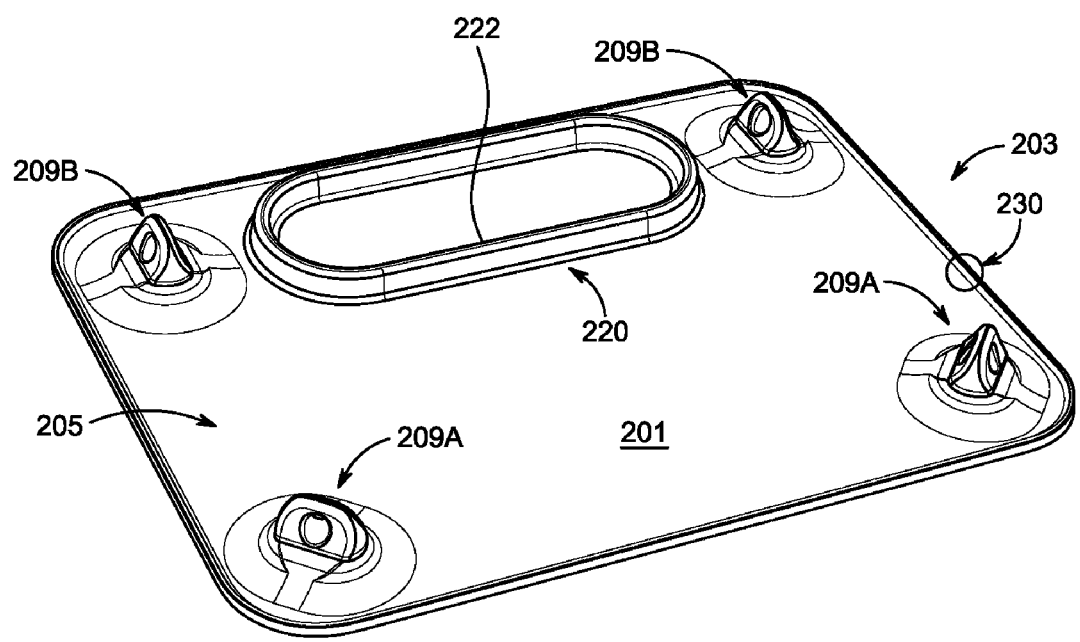
FIG. 2A is a perspective view of the front side of an exemplary placemat.
Figure 2B:
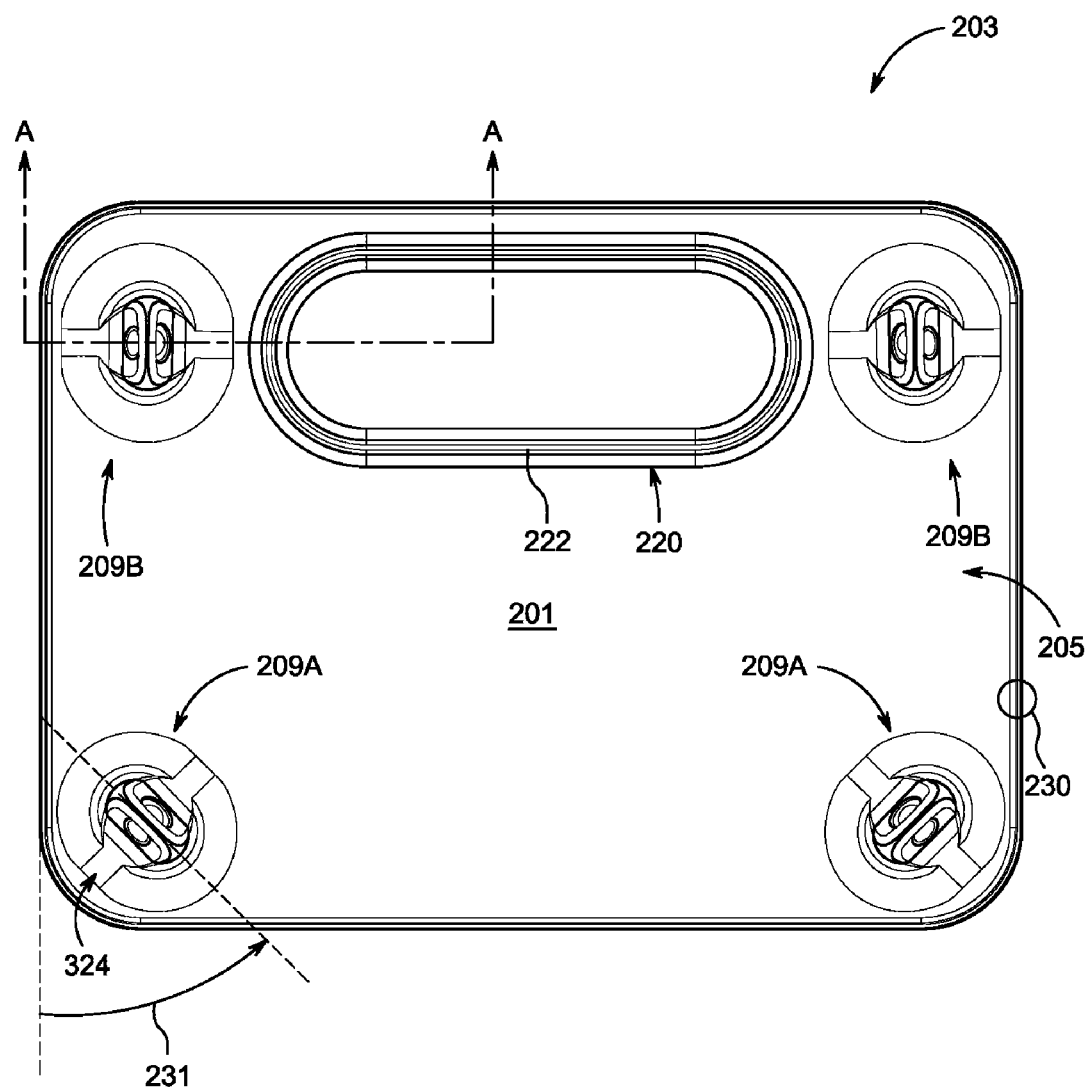
FIG. 2B is a top view of the front side of an exemplary placemat.
Figure 2C:
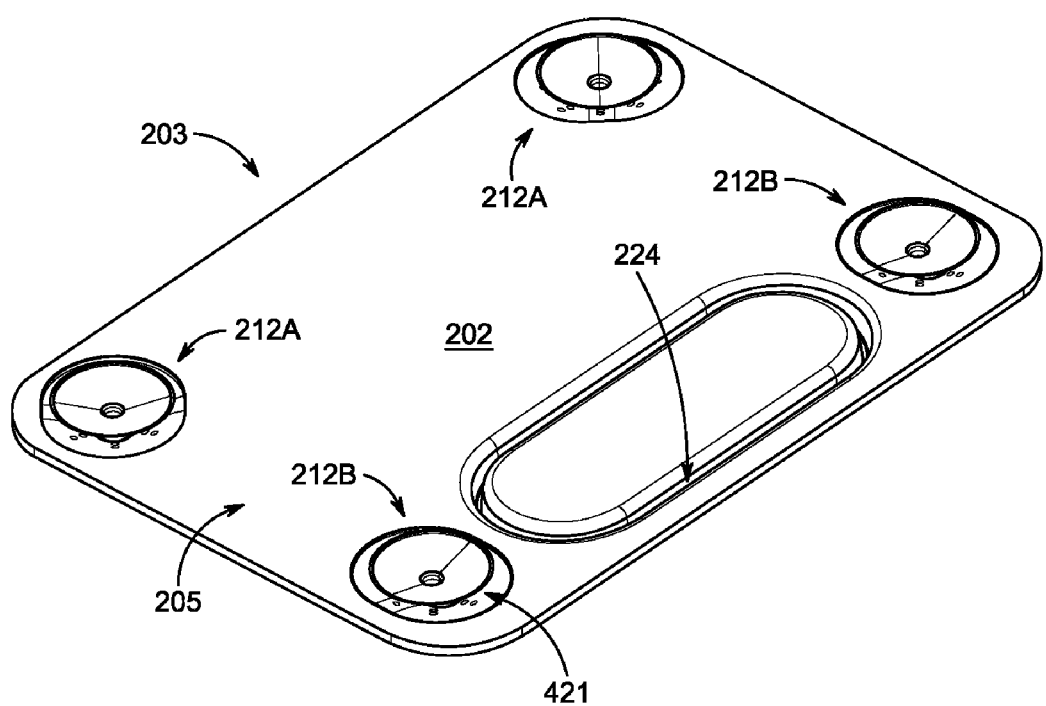
FIG. 2C is a perspective view of the back side of an exemplary placemat.
Figure 2D:
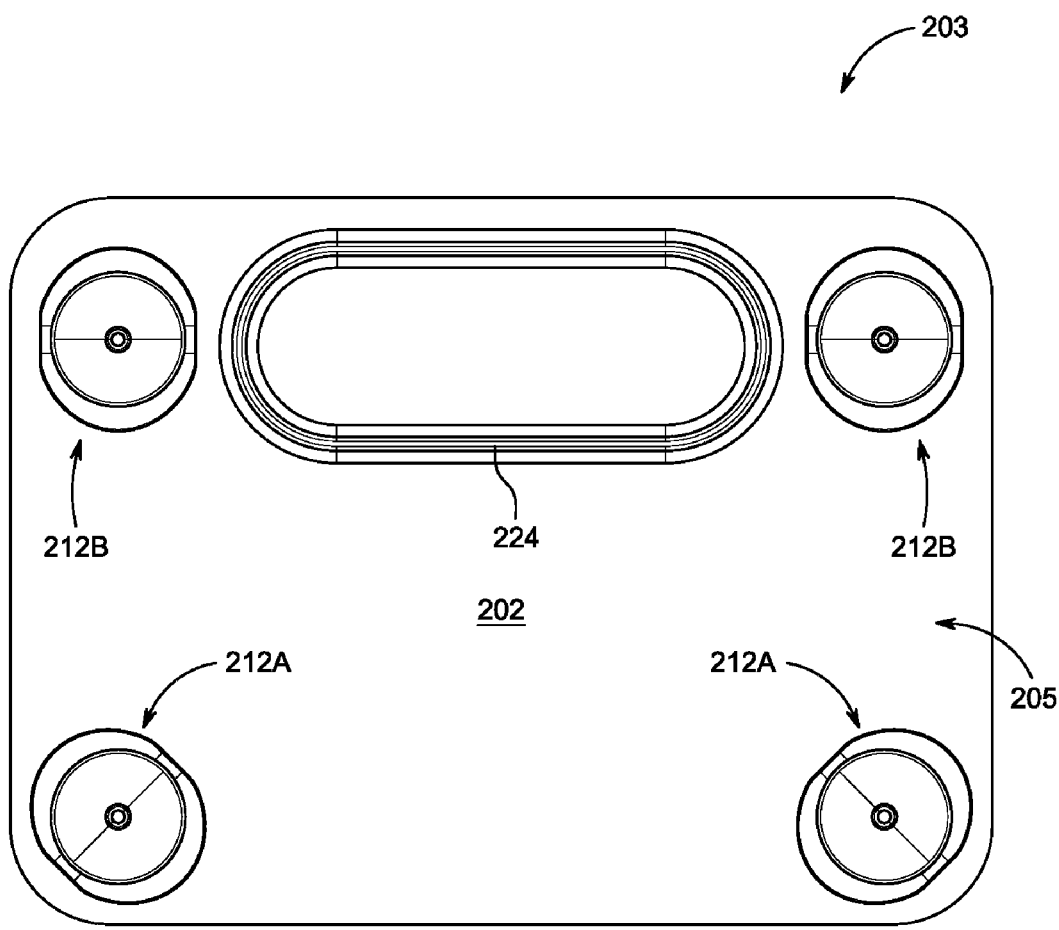
FIG. 2D is a top view of the back side of an exemplary placemat.

FIG. 2A and FIG. 2B are, respectively, perspective and top views of a front side 201 of another embodiment of a placemat 203 for use in a placemat and tether system; FIG. 2C and FIG. 2D are, respectively, perspective and top views of a back side 202 of the placemat 203.

Figure 4A:
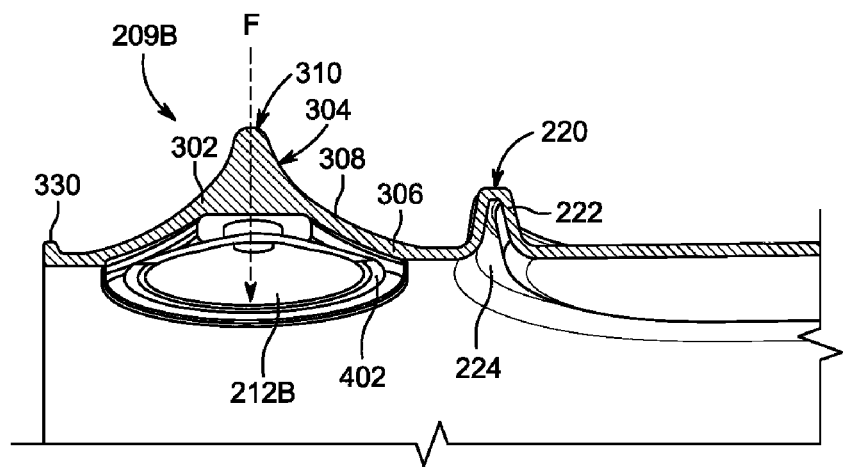
FIG. 4A is a cross-sectional perspective view taken along line A-A of the placemat of FIG. 2B.
Figure 4B:
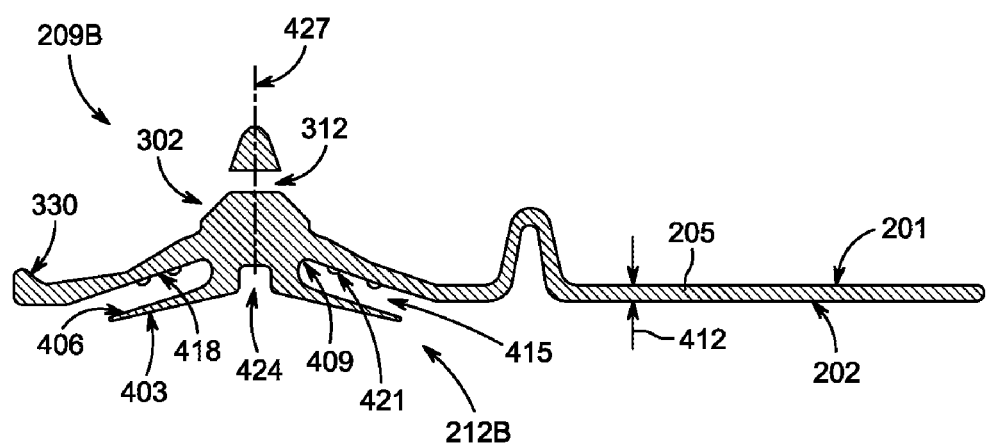
FIG. 4B is a cross-sectional view taken along line A-A of the placemat of FIG. 2B.

In the embodiments shown in FIGS. 2A-2D, the placemat 203 comprises a mat body 205, a front side 201, a back side 202 and a thickness 412 (shown with reference to FIG. 4B). The front side 201 is the side that generally faces or is otherwise accessible to a user of placemat 203. The back side 202 is the side that faces a substrate upon which the placemat 203 is secured. A suitable substrate could include, for example, a top surface of a table or high chair, or a vertical surface, such as a refrigerator door, bathtub or shower wall, patio door or window.

Front side 201 and back side 202 may comprise a finished surface to impart desired haptics or functionality to placemat 203. In one example, front side 201 comprises a matte finish with a desirable feel and appearance, while back side 202 comprises a glossy finish to improve friction and stick between a surface of back side 202 and a surface of a substrate upon which placemat 203 is placed or secured.

To provide added functionality to placemat 203, one or more receptacles 220 may be formed on front side 201 of placemat 203 and may be defined by a raised boundary 222 extending from a surface of front side 201. Food or other objects may be placed and organized in receptacle(s) 220 for easy reach and access by a user of placemat 203. Although shown as a single oval shape in FIGS. 2A and 2B, it may be appreciated that the number, shape and dimensions of the receptacle(s) 220 may be flexibly designed, configured and manufactured based on the anticipated needs of anticipated users (e.g., babies, toddlers, adults with muscle or movement disorders, etc.).

In some embodiments, the boundary 222 may correspond to a recess 224 on the back side 202 that reduces the amount of material required in forming boundary 222 and placemat 203 or for providing improved compressibility and flexibility of boundary 222 to facilitate rolling-up and storage of placemat 203.

A lip 230 may be formed around a perimeter of the front side 201 of the placemat 203 to help contain spillage of foods or liquids on a surface of front side 201 during use. Boundary 222 may provide the same function with respect to foods or liquids spilled within the area of receptacle 220. It may be appreciated that the height of boundary 222 as well as lip 230 may be any suitable dimension to sufficiently prevent the spilling of foods or liquids beyond the boundary 222 or lip 230 of placemat 203 while not interfering with rolling-up or storing of the placemat 203 when not in use. In some embodiments, the lip 230 may extend approximately 1 mm to 5 mm above the front-side surface 201; in other embodiments, the lip 230 may extend approximately 1 mm to 3 mm above the front-side surface 201. In some embodiments, the boundary 222 may extend 10 mm to 50 mm above the front-side surface 201; in some embodiments, the boundary 222 may extend 20 mm to 40 mm above the front-side surface 201; in some embodiments, the boundary 222 may extend 30 mm above the front-side surface 201.

Figure 5:
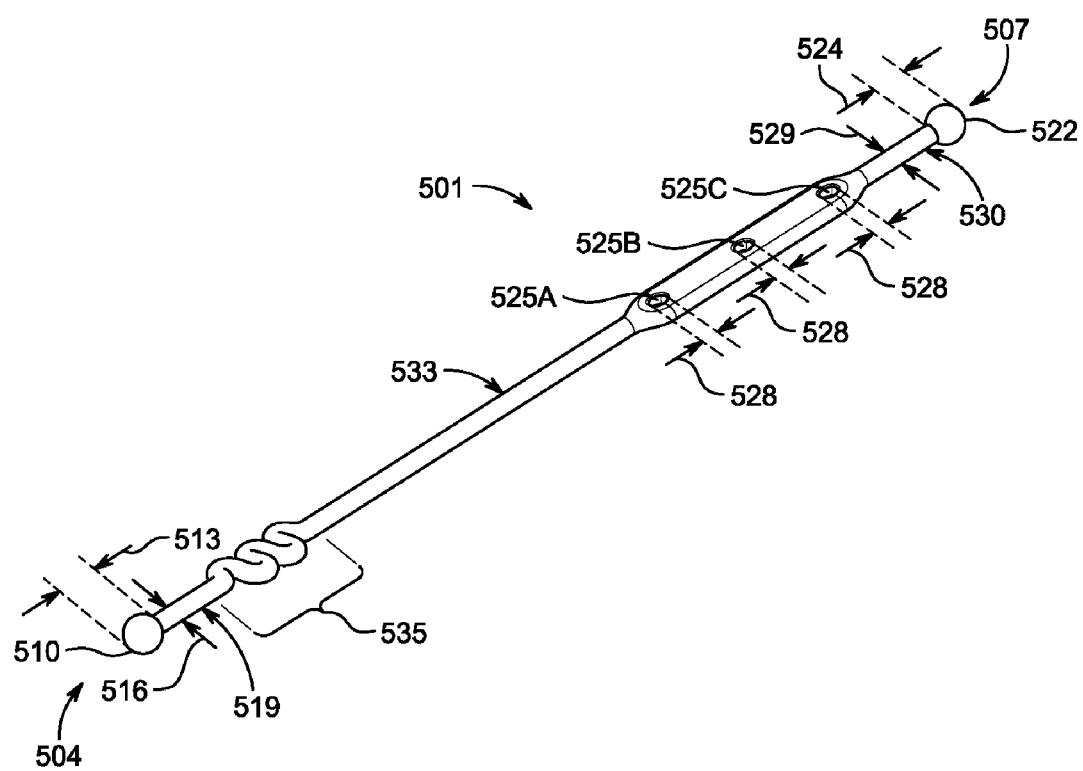
FIG. 5 is a perspective view of one embodiment of a tether suitable for placemat anchors.
Figure 7:
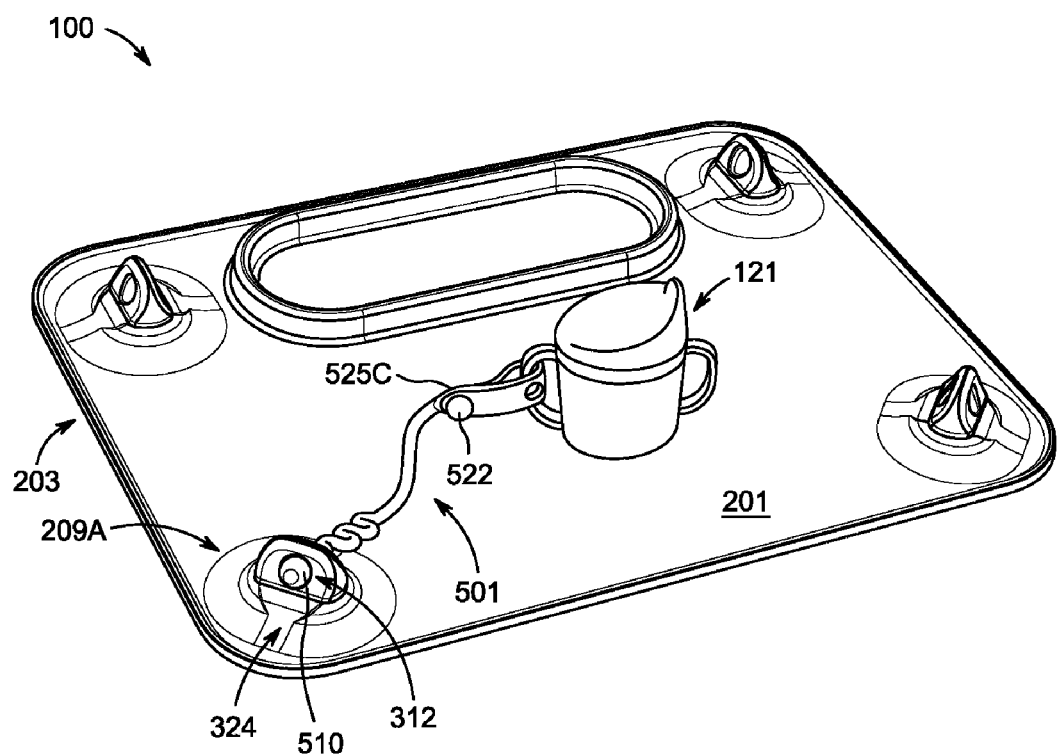
FIG. 7 is a placemat system showing the tether attached to an anchor of the placemat and to an object.

In the embodiment shown in FIGS. 2A and 2B, a plurality of anchors 209A and 209B are provided on front side 201 of the placemat 203. Each anchor 209A or 209B is configured to receive an elongated tether, such as elongated tether 106 (FIGS. 1A and 1B), or elongated tether 501 (FIGS. 5 and 7). Although four anchors 209A, 209B are shown, any suitable number of anchors may be provided. However, having at least four anchors 209A, 209B, one in proximity to each corner of placemat 203, can be advantageous for securing the four corners of a rectangular placemat 203.

Turning to FIG. 2C, a plurality of suction cups 212A, 212B are provided on back-side surface 202 of placemat 203. In some embodiments, each suction cup 212A, 212B has a structure that is integral with corresponding anchor 209A or 209B on the front side 201 of placemat 203. That is, in such embodiments, the anchor 209A or 209B is directly connected to the corresponding suction cup 212A or 212B through the thickness 412 of the mat body 205, via a stem 409 (see FIG. 4B). In some embodiments, the stem 409 and the suction cup 212B are coaxial, and the axis 427 runs through the aperture 312 (see FIGS. 3A-C, 4B).

Figure 3A:
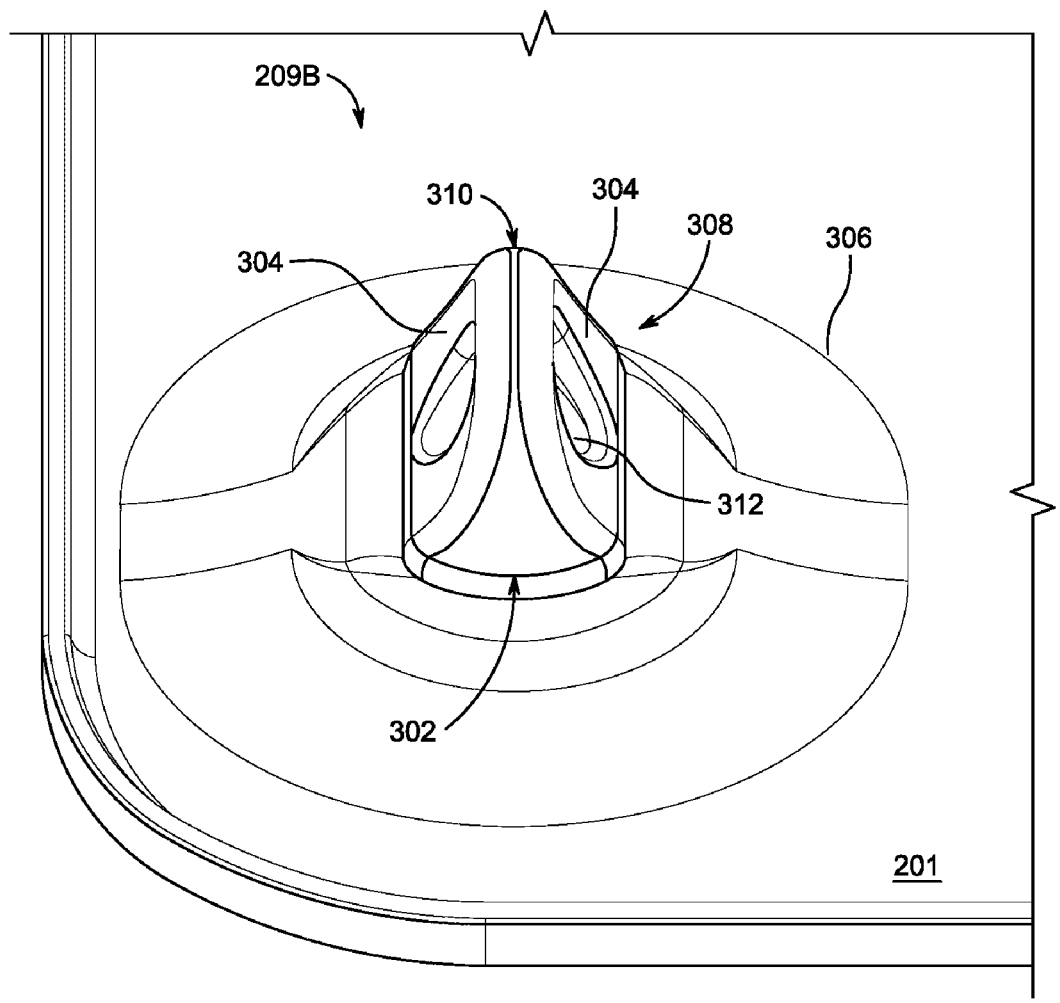
FIG. 3A is a perspective view of an exemplary anchor.
Figure 3B:
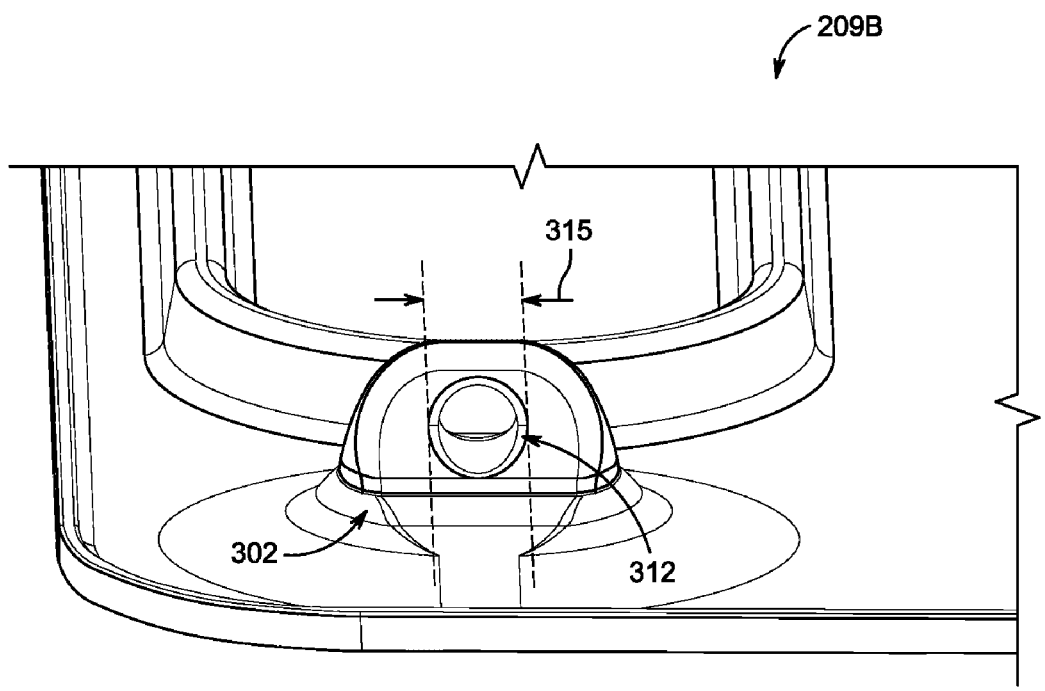
FIG. 3B is another perspective view of the exemplary anchor of FIG. 3A.

FIGS. 3A and 3B are exploded perspective views of the tether anchors 209B and 209A. In some embodiments, the anchor 209B comprises an anchor block 302 with two sloped faces 304, a base 306, tapered surface 308, apex 310 and an opening or aperture 312 that is characterized by an aperture diameter 315. In the embodiment shown in FIGS. 3A and 3B, the anchor 209B has one aperture 312.

The faces 304 may be symmetrical and presented on both sides of anchor body 302, with apertures 312 formed as a through-hole in anchor body 302 communicating from one face 304 to the other face 304 (i.e. one side to the other). A tapered surface 308 (including sloped faces 304) extends from the base 306 of anchor 209B, until reaching an apex 310. A diameter of base 306 is therefore larger than a length of a top edge of the apex 310.

As may be appreciated, by including the smooth tapered surfaces of anchor 209B, the overall design of front side 201 of placemat 203 can provide for a contiguous, smooth surface profile substantially void of crevices, nooks or crannies in which food, liquids or germs can get stuck. Such a design of placemat 203 may facilitate efficient and effective cleaning with a cloth, disinfecting wipe, or other cleaning agent. The apertures 312 may be sized to enable a wipe to be passed through. For example, in some embodiments, the apertures 312 may be between 5 mm and 15 mm, or more preferably, between 5 mm and 10 mm; in some embodiments, the apertures 312 are 6 mm in diameter.

In some embodiments, an anchor may have a similar construction as described above—comprising an anchor block, faces, a base, a tapered surface and an apex—but the anchor may be larger than described and depicted and have two or more apertures. It may be appreciated that anchors having any number of apertures may be combined on a placemat. For example, in the case of a smaller placemat, such as one configured to provide for younger babies, for improved portability, or for smaller surfaces, anchors having only one aperture may be desirable to save space and create a more compact overall placemat design. In the case of a larger placemat, one or more anchors may be provided with two apertures each, to allow for the attachment of more items or toys. Regardless of their number in any given anchor block, aperture(s) 312 are structured to receive an elongated tether, such as the elongated tether 501 that is described with reference to FIG. 5, for attaching toys, utensils or other items to placemat 203.

FIG. 4A is a cross-sectional perspective view taken along section A-A of FIG. 2B; FIG. 4B is a cross-sectional view taken along the same section A-A. FIGS. 4A and 4B illustrate additional details of the exemplary anchor 209B showing the integrated structure of anchor body 302 with suction cup 212B extending from the back side 202 of placemat 203. Due to this integrated structure as well as the symmetrical tapered design of anchor body 302, a user may grip the tapered faces 304 of anchor body 302 between his or her fingers (e.g., thumb and forefinger), and effectively apply force F (dashed arrow in FIG. 4A) and communicate such force directly to exemplary suction cup 212B. Accordingly, suction cup 212B (and other suction cups 212A and 212B) may be secured with more force to a substrate, thereby providing improved securement of the exemplary placemat 203 to a variety of surfaces, whether horizontal or vertical. Further, the integrated structure of anchor 209B with suctions cup 212B may be robust over repeated use and less prone to failure compared with other suction cup designs.

In some embodiments, suction cup 212B may be provided in a state where a rim 402 edge is in a normally recessed position relative to the back-side surface 202, such that the suction cup 212B will not engage with a surface or substrate upon which placemat 203 is positioned unless there is an external application of force F to the anchor 209B. In other embodiments, the suction cup 212B, including its rim 402, extends slightly below the back-side surface 202, but a force F may still be required to evacuate sufficient air between a surface and the suction cup 212B to create a strong suction force. In some embodiments, the configuration of the suction cup 212B relative to the back-side surface 202 may enable the placemat 203 to lay substantially flat against the substrate to which it is adhered.

FIG. 4B is a cross-section view taken along section A-A of FIG. 2B and illustrates additional detail of an exemplary anchor 209B. In some embodiments, the anchor 209B comprises the anchor block 302 with aperture 312, and suction cup 212B. Suction cup 212B has a sealing surface 403 and an outer surface 406. A stem 409 connects the suction cup 212B to the anchor block 302, through a thickness 412 of the mat body 205, such that the anchor block 302 extends from the front side 201 of the mat body 205 and the suction cup 212B extends from the back side 202 of the mat body 205. In some embodiments, the suction cup 212B is at least partially disposed within a recess 415 in the thickness 412 (or in some embodiments, a recess 415 or indentation 415 relative to a plane that corresponds with the back surface 202). In some embodiments the stem 409 is coaxial with the suction cup 212B, e.g., along an axis 427 that may run directly through the aperture 312. In some embodiments, the suction cup 212B is disposed directly opposite the anchor block 302, through the thickness 412.

In some embodiments, texture is added to either or both of the outer surface 406 and a wall 418 of the recess 415, to prevent the outer surface 406 from sticking to the wall 418. In some such embodiments, the texture comprises molded protrusions, such as the exemplary protrusion 421 (see also FIG. 2C). In some embodiments, the texture comprises a rough or matte finish on one of the outer surface 406 and the wall 418.

In some embodiments, the sealing surface 403 has a glossy surface to improve the ability of the suction cup 212B to stick to a corresponding substrate. In some embodiments, the back-side surface 202 also has a glossy finish to increase its coefficient of friction relative to common substrates such as table surfaces, window glass, bath tiles, etc. In some embodiments, the suction cup 212B includes an internal recess 424 that enables the suction cup 212B to be pushed closer to a corresponding substrate, such that additional air can be pushed out and a stronger suction created when force F is applied (see FIG. 4A).

The entire design of placemat 203 may be integrated and comprise a single molded article, including for example anchors 209A and 209B, suction cups 212A and 212B, and receptacle 220. Benefits of this design include a decreased tooling and manufacturing costs arising from a single material, and a single mold and one-step manufacturing process, requiring no additional assembly of components. An example of a suitable manufacturing process for placemat includes compression molding processes.

Suitable materials may include natural rubber, synthetic rubbers or rubber-like materials, and preferably materials capable of being compression molded, as well as being free from chemicals that are potentially harmful to human users, such as BPA, BPS, PVC and phthalates. In one example, placemat 203 may comprise food-grade silicone, and may also be dishwasher safe for easier cleaning and disinfection.

In some embodiments, the material is compressible to facilitate coupling between the elongated tether 106 and the anchor blocks 109 shown in FIGS. 1A and 1B. For example, the material may have a Shore A durometer hardness of about 45 to about 65, or more preferably, of about 50 to about 60. ("About" in this disclosure may mean, for example, within 1%, or 5%, or 10% or 20% of the nominal value.)

FIG. 5 is a perspective view of an example elongated tether 501 suitable for use with an exemplary placemat, such as placemat 103 or placemat 203. Elongated tether 501 comprises an anchor end 504 and a retention end 507. The anchor end 504 includes an anchor terminus 510, which, in some embodiments, is generally spherical and characterized by an anchor diameter 513. The anchor diameter 513 is configured to interface with an aperture of an anchor block, such as the aperture 312 of the anchor block 209B, via an interference or compression fit. That is, the anchor terminus 510 is dimensioned to have an anchor diameter 513 that is larger than the aperture diameter 315 of the aperture 312, while a tether diameter 516 that characterizes the elongated tether 501 adjacent the anchor terminus 510 (e.g., segment 519) is smaller than the aperture 312. Furthermore, the material from which the anchor terminus 510 is made is compressible. Thus, the anchor 510 terminus can be compressed and manipulated into and through the aperture 312. Once the anchor terminus 510 passes all the way through the aperture 312, its compressible material expands to its nominal dimension, in which state the anchor diameter 513 is larger than aperture diameter 315—thereby securing the elongated tether 501 to the anchor block 209B. In FIGS. 1A and 1B, elongated tether 106 is shown as being secured to anchor 109 in the manner just described.

In some embodiments, the material for the elongated tether 501 is the same as the material for the placemat 203 and anchor block 209B. In some embodiments, this material is a food grade silicone having a Shore A durometer hardness of about 45 to about 65, or more preferably, of about 50 to about 60. In some embodiments, in addition to the anchor terminus 510 being compressible, the aperture 312 may be expandable (e.g., elastic), such that the anchor diameter 513 shrinks and the aperture diameter 315 expands as the elongated tether 501 is secured to the anchor block 209B.

A compressible and elastic material that is safe for human oral contact, such as food-grade silicone, has additional advantages. For example, a tether 501 comprising such material may be suitable for teething by a baby or toddler user. Moreover, compressibility and elasticity may promote development of a user's dexterity, finger strength and fine motor skills as the user manipulates the tether 501 or objects attached thereto.

As shown in FIG. 5, the elongated tether 501 also comprises a retention terminus 522 at its retention end 507, characterized by a retention diameter 524; and a series of retention apertures 525A, 525B and 525C, each of which is characterized by a retention aperture diameter 528. The retention terminus 522 and retention apertures 525A, 525B and 525C are also configured to interface with each other via an interference or compression fit, like the anchor terminus 510 and aperture 312. That is, the nominal diameter 528 of the retention apertures 525A, 525B and 525C is smaller than the nominal retention diameter 524 of the retention terminus 522, but larger than a diameter 529 of a stem portion 530 of the elongated tether 501. The material of the elongated tether 501 is compressible, such that the retention terminus 522 can be compressed and/or the retention apertures 525A, 525B and 525C can be expanded, enabling a user of the elongated tether 501 to form a loop using the retention end 507 of the elongated tether 501 to secure a toy, cup or other utensil (as is depicted in another embodiment in FIGS. 1A and 1B, with elongated tether 106, toy 118 and cup 121).

In some embodiments, the elongated tether 501 comprises three retention apertures 525A, 525B and 525C, enabling a user to vary a size of the loop formed when the retention terminus 522 is secured in one of the retention apertures— e.g., a relatively smaller loop is formed when the retention terminus 522 is secured in the retention aperture 525C; and a relatively larger loop is formed when the retention terminus 522 is secured in the retention aperture 525A.

In some embodiments, more or fewer retention apertures may be provided than shown in FIG. 5. In some embodiments, the retention diameter 524 is the same as the anchor diameter 513; in other embodiments, the retention diameter 524 and anchor diameter 513 are different, as is the retention-aperture diameter 528 and the aperture diameter 315—in order to force users to secure the anchor terminus 510 only to anchor block 209B and the retention terminus 522 only to retention apertures 525A, 525B or 525C.

As shown in FIG. 5, elongated tether 501 also comprises an elastic region 535 whose design may facilitate stretching of the elongated tether 501 along its length. In some embodiments, the material from which the elongated tether 501 is made is elastic, such that the elastic region 535 stretches out when pulled but returns to its original state when a pulling or stretching force is removed. In some embodiments, the entire elongated tether 501 may stretch, including the segments 519, 530 and 533 and points in-between, though the elastic section 535 may provide greater elasticity than the other portions.

In FIG. 5, the elastic region 535 is depicted as a two-dimensional serpentine winding of the material of the elongated tether 501 along the same relatively two-dimensional plane. In contrast with a three-dimensional spring or helical structure, the depicted elastic region 535 may be less likely to become tangled when twisted around and used by a baby or young child. In addition, this structure may maintain its functionality stably over repeated use. Further, a two-dimensional serpentine winding design may facilitate easier manufacturing (e.g., through a single-step compression molding process).

In some embodiments, the elastic section 535 may comprise fewer serpentine winding sections. The elastic sections 535 of elongated tethers 106 and 501 are shown as comprising five back-and-forth half-circular arcs, but a smaller or larger number of back-and-forth half-circular arcs could be provided. By varying the length of the elastic section 535 (e.g., by varying the number of back-and-forth half-circular arcs), a maximum length (or maximum length given a certain amount of force) can be set. For example, in some embodiments, the elongated tether 501 is configured to not exceed 12 inches when subjected to five pounds of stretching force. Such design parameters may be set, in some embodiments, to meet governmental regulations, such as regulations designed to minimize choking or strangulation hazards. In some embodiments, the length of the segments 519, 533 and 530 may also be varied to provide an elongated tether 501 that is longer or shorter or that facilitates the securing of smaller or larger objects. Numerous variations are possible to the design of the elongated tether with departing from the scope of this disclosure.

With the elastic section 535, the elongated tether 501 can provide an expandable zone for objects to be moved around a corresponding placemat 203, and provide a baby or other user physical feedback in response to stretching and pulling motions that can aid in motor-skill development and coordination. Further, the elastic section 535 can absorb some of the stretching and pulling force that is applied to the overall elongated tether 501, which can, in some embodiments further secure a connection between the anchor terminus 510 and an aperture 312 of an anchor block 209B.

Figure 6:
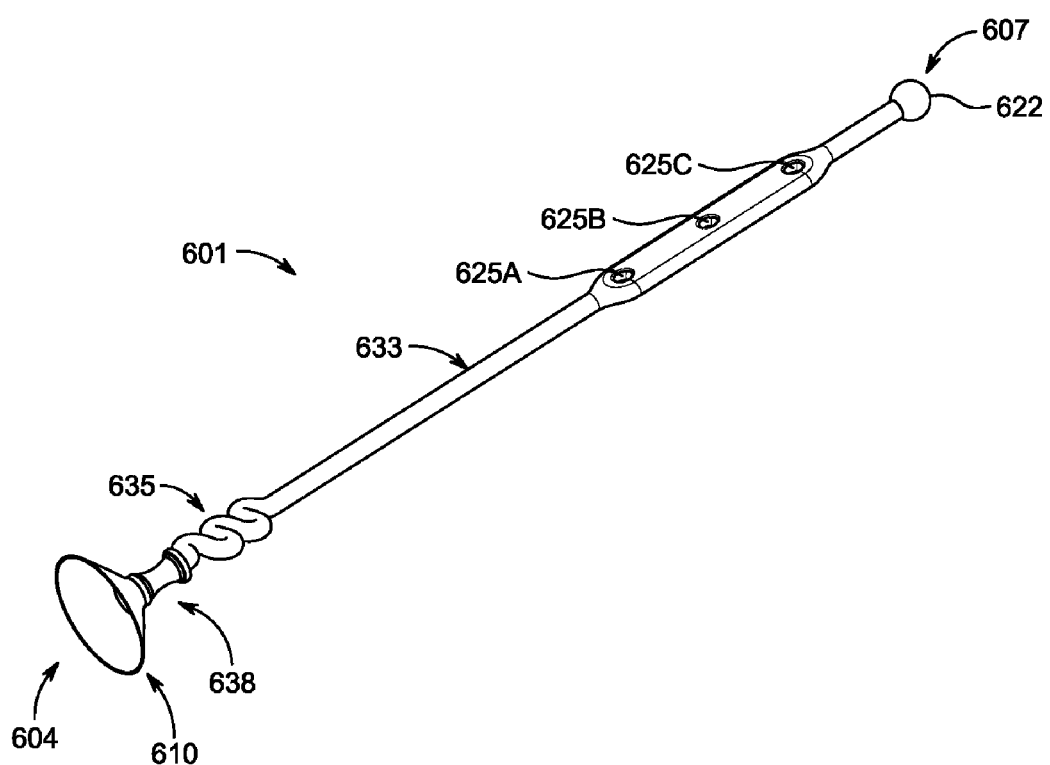
FIG. 6 is a perspective view of another embodiment of a tether.

FIG. 6 shows another embodiment of an elongated tether 601. In this embodiment, the elongated tether has an anchor end 604 and a retention end 607, and the retention end 607 operates in a similar manner as the retention end 507 described with reference to FIG. 5. That is, a retention terminus 622 can engage, via an interference or compression fit, into one of a plurality of retention apertures 625A, 625B or 625C to retain an object. Similar to the elongated tether 501, the elongated tether 601 comprises an elastic section 635. However, in this embodiment, elongated tether 601 comprises a suction cup 610 in place of the generally spherical terminus 510. As shown, the elongated tether 601 comprises a grip 638 adjacent the suction cup 610 that is suitable for gripping, for example, by a user's thumb and forefinger. In some embodiments, the elongated tether 601 can be provided with one or more elongated tethers 501 and a corresponding placement 203 in a "kit" that can provide a number of different tether options. For example, elongated tether 601 could be used in vertical-mount applications, such as with a placemat 203 mounted to a patio door, window or tiled wall adjacent a bath tub, to provide additional tethering options next to or independent of a placemat 203.

FIG. 7 is a perspective view of a placemat and tether system 100 in use. FIG. 7 shows the front side 201 of placemat 203 and elongated tether 501 in use as a system 100, including an example of a cup 121 attached to elongated tether 501, which is anchored to placemat 203. The anchor terminus 510 of the elongated tether is shown disposed through aperture 312 of anchor 209A and secured via an interference fit. The retention terminus 522 is placed through aperture 525C and secured via an interference fit. As described with reference to FIG. 5, the anchor terminus 510 and retention terminus 522 may be generally spherically shaped, with diameters that are nominally (e.g., in a non-compressed state) larger than the apertures with which they engage. In some embodiments, the termini may be mushroom-shaped, or shaped in any other manner that permits an interference fit sufficiently strong to resist the expected forces that a user, such as, for example, a baby, young child or adult with a movement disorder, may apply.

Once an anchor terminus 510 or retention terminus 522 regains its original diameter after being pushed through a corresponding interference-fit aperture, the interference fit is not easily overcome. That is, the elongated tether 501 is not easily pulled from the anchor 209A, nor is it easily disconnected from the cup 121 or other object. Rather, to detach the elongated tether 501 from anchor 209A, a user (such as a caregiver) may need to engage fine dexterity and enough force to massage and manipulate the anchor terminus 510—e.g., by pushing on it at the same time and holding a portion of anchor 209A stable, until the anchor terminus 510 has been compressed down and passed back through aperture 312. Accordingly, with the exemplary design shown in FIG. 7, it may be exceedingly difficult for even a determined baby or young child to break the elongated tether 501 free of the anchor 209A, due to the characteristics and dimensions of the materials used for placemat 203 and elongated tether 501; their selected hardness durometer; the dimensions and geometries of the apertures 312, 525A, 525B and 525C; the dimensions and geometries of the anchor terminus 510 and retention terminus 522; and the manner of securing the interference fit, for example.

To further increase security of the above-described attachments, a face 324 of one or more anchors, such as the anchor 209A, may be angled relative to the user's normal position, such that any attempts to pull on tether 501 toward their body or within their zone of reach would be made at an angle relative to an axis of the aperture 312, thereby causing the anchor terminus 510 to be misaligned with that aperture 312 axis. For example, with reference to FIG. 2B, the face 324 may be positioned at an angle 231 relative to a side of the placemat 203. In some embodiments, the angle is between about 30 and 60 degrees; in some embodiments, the angle is about 45 degrees.

Although elongated tether 501 has been described as one example of a suitable means of attachment using anchors 209A and 209B, it may be appreciated that other attachment means compatible with apertures 312 may also be utilized, including rings, straps, etc. In one embodiment, placemat 203 and tether 501 are provided as a placemat system 100; in other embodiments, placemat 203 and tether 501 are provided or sold separately; in still other embodiments, elongated tether 601 may be provided separately or as part of system 100 with placemat 203 and/or tether 501.

Placemat 203, elongated tether 501, as well as the combined system 100 therefore provide numerous advantages, including, for example, reducing the burden and challenges of child care or patient care and promoting child development and safety. For example, careful and supervised use of placemat 203 or its system 100 on a vertical surface, such as attached to a refrigerator door, patio door or window, may promote development of a child's standing and balance, and may keep a child preoccupied and out of the way of active caregivers while they are preparing food or engaging in other tasks. When placemat 203 or system 100 is attached to bathtub wall, tethered bath toys may be kept within reach of the baby, preventing them from floating away.

System 100 comprising placemat 203 and elongated tether 501 can be used in a horizontal application, such as with a high chair. In some embodiments, the retention apertures 525A, 525B and 525C are dimensioned to accommodate a crayon, marker or utensil, without use of the retention terminus 522; that is, in such embodiments, a marker or utensil may be retained by the apertures 525A, 525B and 525C themselves. In some embodiments, spacing between the retention terminus 522 and the retention apertures 525A, 525B and 525C is configured such that a loop may be formed by engaging the retention terminus 522 with one of the retention apertures 525A, 525B or 525C that can accommodate common utensils or toys, such as large, easy-grip toddler utensils, large markers, baby cup handles, etc.

In some embodiments, the front surface 201 of placemat 203 is configured in material and texture to enable the front surface to be an erasable writing surface when used with appropriate markers or other toddler-appropriate writing or drawing implements. That is, in such embodiments, that front surface 201 may be easily washable yet textured to receive and temporarily retain marker ink—thereby providing a writing surface 201 that may occupy toddler users after a meal, which could first be served on the same surface 201.

Figure 8A:
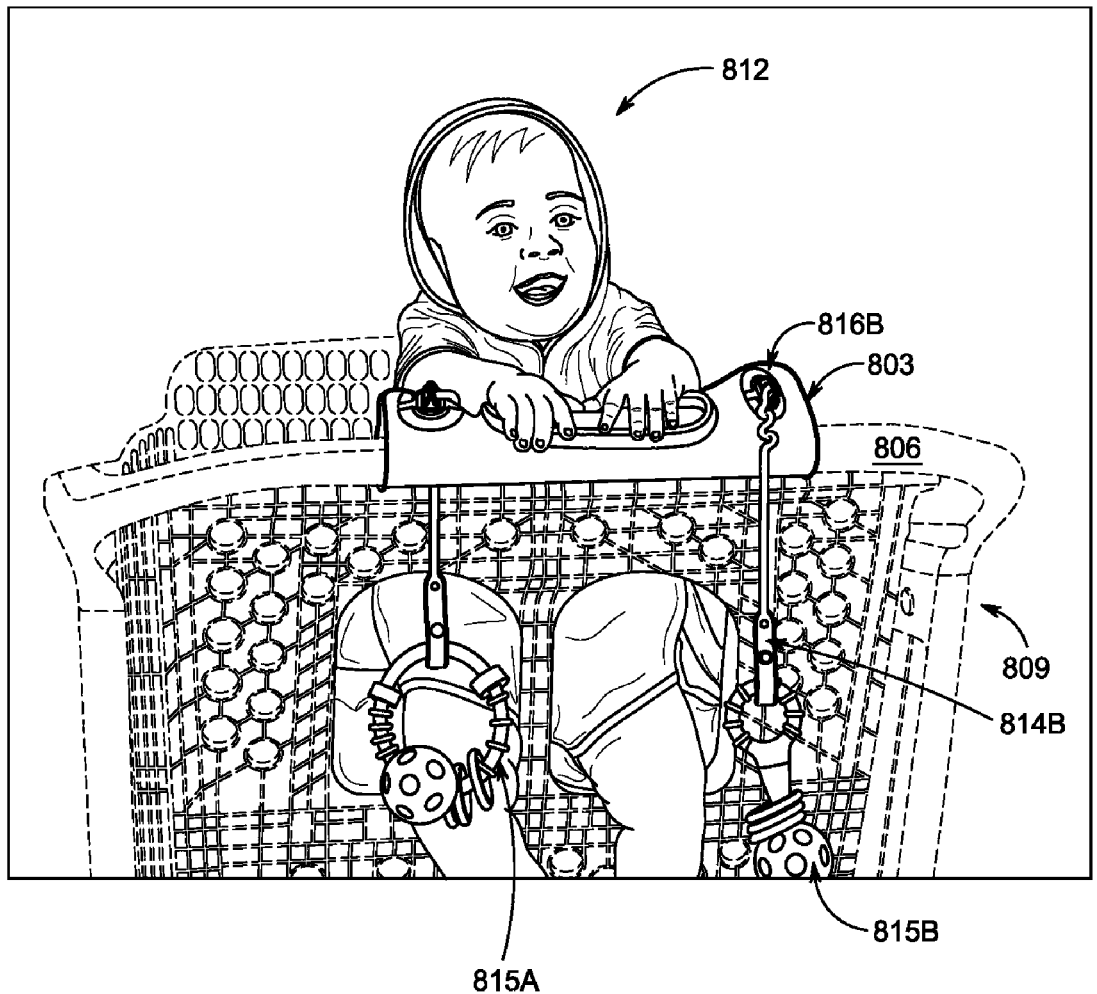
FIG. 8A illustrates an exemplary application of a flexible mat.

FIG. 8A illustrates an exemplary application of a flexible mat 803. As shown, the flexible mat 803 is wrapped around the handle 806 of a shopping cart 809. A toddler 812 is seated in the shopping cart 809, and the flexible mat 803 provides both a covering for the surface of the handle 806 and an anchor for objects 815A and 815B. As shown, objects 815A and 815B are toys; object 815A or 815B could also be another object of interest to a toddler or infant, such as, for example, a pacifier, a stuffed animal, a cup, a rattle, or a marker, which, in some embodiments, could be used by the toddler 812 to color on the flexible mat 803.

Figure 8B:
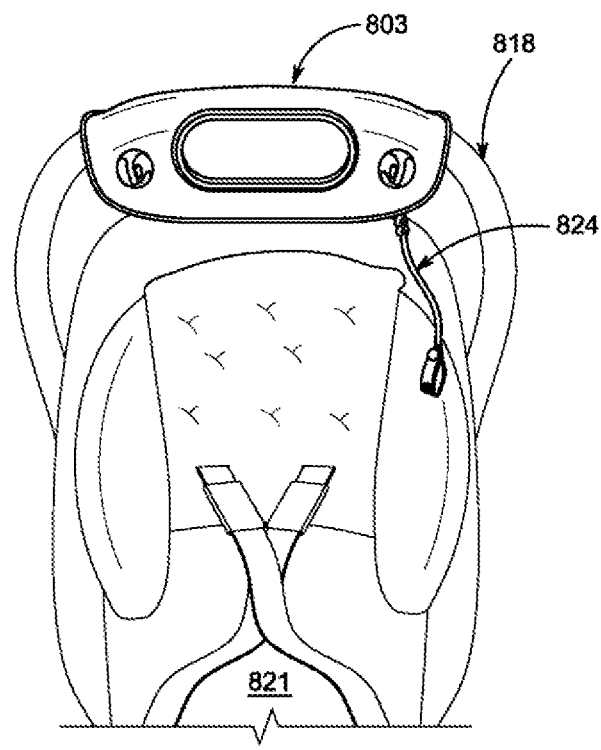
FIG. 8B illustrates an exemplary application of a flexible mat.

FIG. 8B illustrates another exemplary application of a flexible mat 803. As shown, the flexible mat 803 is wrapped around the handle 818 of a baby carrier 821. The baby carrier 821 may double as a car seat, and the flexible mat 803 may serve as an anchor for a tether 824. The tether 824 may, in turn, secure an object (not shown), such as a toy or other object that could be of an interest to an occupant of the baby carrier 821. In such an application, the flexible mat 803 may be used to occupy an infant or toddler in the baby carrier 821. By disposing the flexible mat 803 around the handle 818, toys or other objects that are secured to the tether 824 can be kept in reach of the infant or toddler occupant.

Figure 8C:
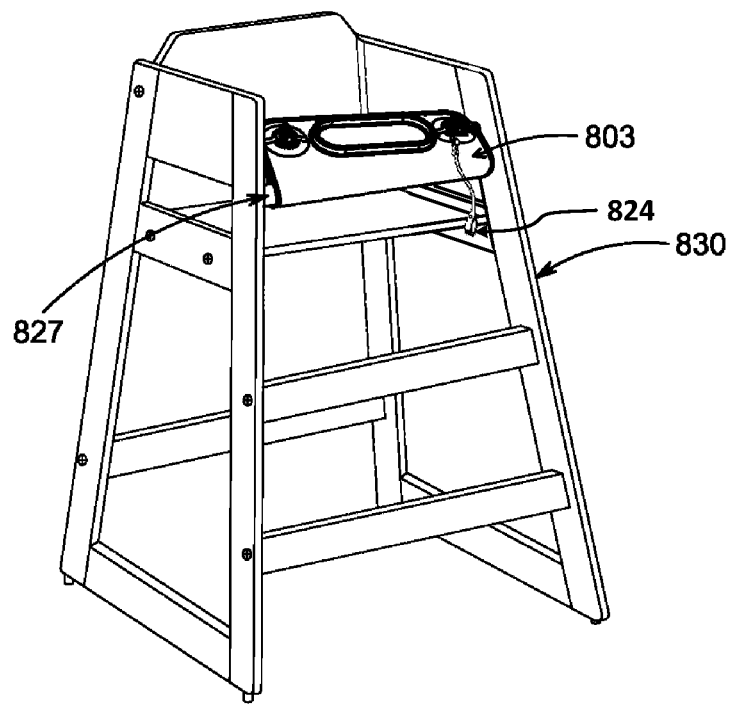
FIG. 8C illustrates an exemplary application of a flexible mat.

FIG. 8C illustrates another exemplary application of a flexible mat 803. As shown, the flexible mat 803 is wrapped around the safety bar 827 of a high chair 830. The high chair 830 shown is of a style that does not include a separate tray (e.g., for food); rather, it is a high chair 830 that can be positioned next to a table that may serve as an eating surface, or one that can be positioned away from a table altogether. In such an application, a tether 824 can be used to secure a toy or other object (not shown) in order to occupy, for example, a toddler seated in the high chair 830. In addition, the flexible mat 803 can provide a clean surface that covers the safety bar 827 of the high chair 830, which safety bar 827 would otherwise be contactable by an occupant of the high chair 830. In such an application, a parent or guardian of a toddler occupant may use the flexible mat 803 to provide a sanitary surface or as an anchor for toys or other objects.

Figure 9:
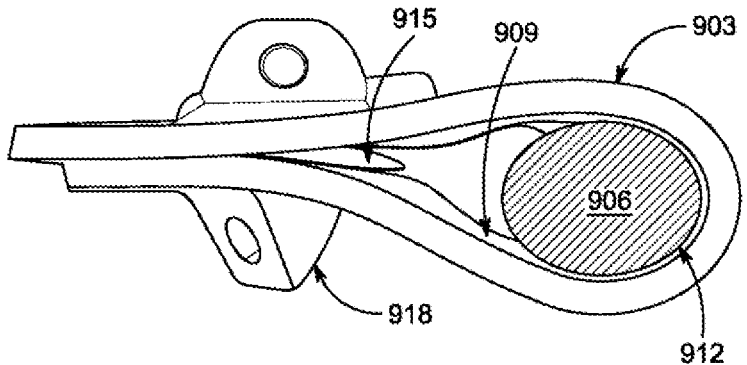
FIG. 9 is a side view of a flexible mat disposed around a crossbar.

FIG. 9 is a side view of a flexible mat 903 disposed around a crossbar 906. As shown, a back side 909 of the flexible mat 903 is in contact with a surface 912 of the crossbar 906. The flexible mat 903 is held in position around the crossbar 906 by two suction cups. Specifically, a first suction cup 915 of the flexible mat 903 is affixed to a second suction cup (not distinctly visible in FIG. 9, but in line with anchor block 918). In other embodiments, a suction cup 915 may be adhered to the back side 909, rather than to a second suction cup.

Figure 10:
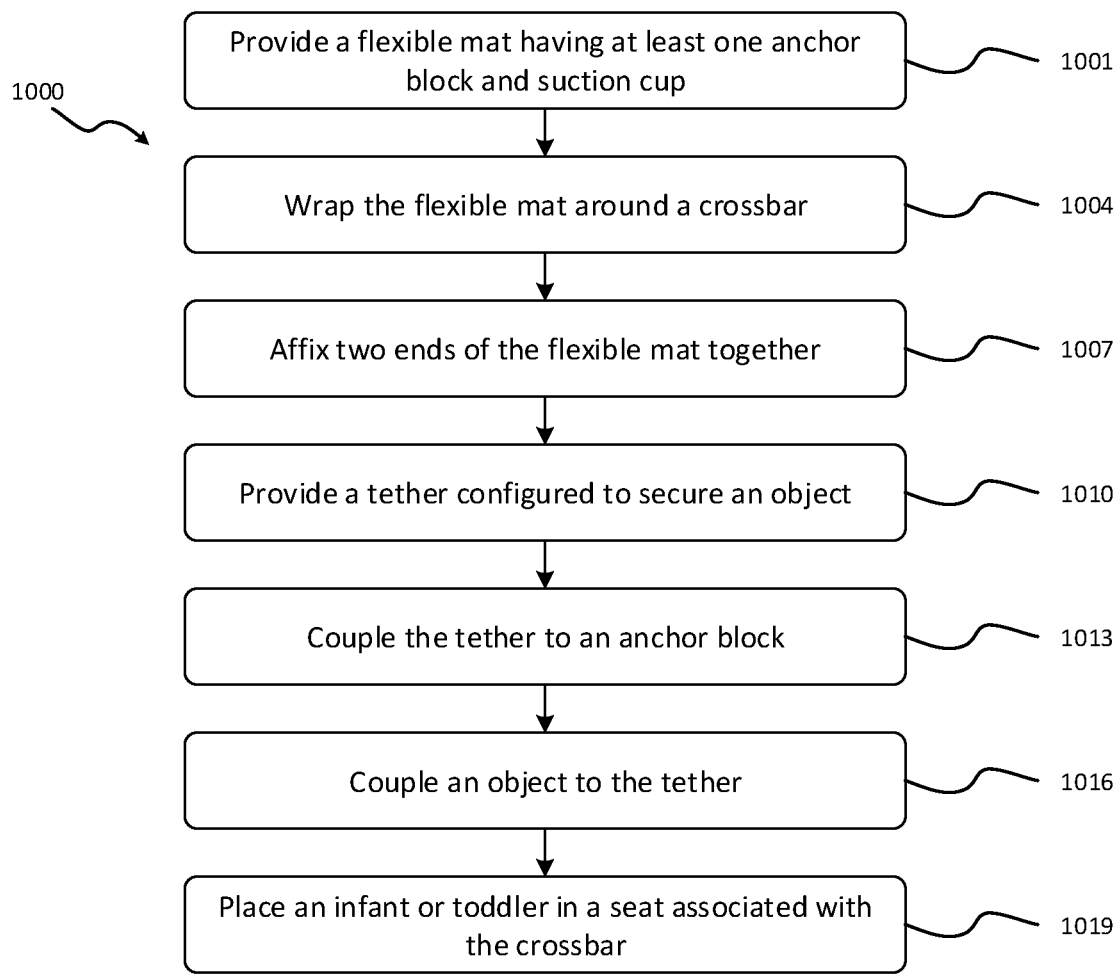
FIG. 10 is a flow diagram of an exemplary method.

FIG. 10 is a flow diagram of an exemplary method 1000. In the embodiment shown, the method 1000 comprises providing (1001) a flexible mat having at least one anchor block and suction cup. For example, a placemat such as the placemat 203 shown in FIGS. 2A-2D could be provided, where the placemat 203 has anchors 209A and 209B and suction cups 212A and 212B. As another example, the flexible mat 803, shown in FIG. 8A could be provided.

The method 1000 further includes wrapping (1004) the flexible mat around a crossbar. For example, the flexible mat 803 could be wrapped around the handle 806 of a shopping cart 809 (see FIG. 8A); as another example, the flexible mat 803 could be wrapped around a handle 818 of a baby carrier 821 (see FIG. 8B); as another example, the flexible mat 803 could be wrapped around a safety bar 827 of a high chair 830 (see FIG. 8C). In each of these examples, a flexible mat is wrapped around a crossbar that is associated with a seat (e.g., a seat for an infant or toddler).

The method 1000 further includes affixing (1007) two ends of the flexible mat together. For example, one end of the flexible mat 903 could be affixed to the other end of the flexible mat 903 by coupling a first suction cup 915 to another suction cup (see FIG. 9)(second suction cup not shown). As another example, a first suction cup 915 could be affixed to a back side (e.g., the back side 909, shown in FIG. 9). Regardless of how the two ends are affixed (1007), the flexible mat can be secured around a crossbar.

The method 1000 further includes providing (1010) a tether and coupling (1013) the tether to an anchor block. For example, a tether 814B could be provided (1010) and coupled (1013) to an anchor 816B, as shown in FIG. 8A. An object can be coupled (1016) to the tether. For example, a toy 815B could be coupled (1016) to the tether 814B (e.g., by disposing the tether retention terminus around or through the toy 815B, and disposing the retention terminus through a corresponding retention aperture on the tether 814B).

The method 1000 further includes placing (1019) an infant or toddler in a seat associated with the crossbar. For example, with reference to FIG. 8A, a toddler 812 may be placed in a seat of the shopping cart 809 having the handle 806 around which the flexible mat 803 is disposed. In this manner, the toddler 812 is protected from coming into contact with a surface of the shopping cart handle 806 that would otherwise be reachable or contactable, but for the flexible mat 803. In addition, the flexible mat 803 can provide an anchor for toys or other objects, such as toys 815A and 815B, which may be of interest to the toddler 812.

In some embodiments, the order of steps in the method 1000 may be rearranged, or some steps may be left out. For example, in some embodiments, the flexible mat 803 (see FIG. 8A) may only serve as a sanitary (e.g., pre-washed or pre-sanitized) surface to protect a toddler from germs that may be present on the shopping cart handle 806; and in such embodiments, the flexible mat 803 may not be used as an anchor for toys. The crossbar may be any structural member. In some embodiments, the crossbar may not be associated with a seat. For example, a flexible mat could be wrapped around the handle of a refrigerator or dishwasher or other appliance; or the flexible mat could be wrapped around an item of furniture (e.g., a table leg or support, a bed railing, etc.), a structural member of a stroller, a bathtub railing, etc. In many embodiments, the crossbar will provide a point to which toys or other objects can be indirectly anchored, by a tether, that is coupled to an anchor on the flexible mat. In many embodiments, the flexible mat covers a surface that may otherwise be contactable (e.g., a surface that may harbor germs). In some embodiments, the flexible mat may only include a single anchor or suction cup.

While several embodiments have been described with reference to exemplary aspects, it will be understood by those skilled in the art that various changes may be made and equivalents may be substituted for elements thereof without departing from the contemplated scope. In addition, many modifications may be made to adapt a particular situation or material to the teachings provided herein without departing from the essential scope thereof. Therefore, it is not intended that the scope be limited to the particular aspects or embodiments disclosed; rather, the scope includes all aspects falling within the appended claims.

What is claimed is:

1. A method comprising:
providing a flexible mat, the flexible mat having (i) a mat body characterized by a front side, a back side and a thickness; (ii) a plurality of anchors, each anchor comprising an anchor block having sloped faces extending from an apex to a base, an aperture extending through the anchor block from one sloped surface to another and configured for receiving a tether, the aperture characterized by an aperture diameter, and a suction cup; each anchor disposed through the thickness, such that its anchor block is on the front side and its suction cup extends from the back side;
wrapping the flexible mat around a crossbar associated with a seat for a toddler or infant, wherein the back side is adjacent a surface of the cross bar;
affixing at least two of the plurality of suction cups to each other;
providing an elongated tether; and
coupling the elongated tether to one of the anchor blocks.

2. The method of claim 1, wherein the elongated tether comprises an anchor end, the anchor end having an anchor terminus characterized by an anchor diameter that is greater than the aperture diameter, the elongated tether comprising a compressible material.

3. The method of claim 2, wherein coupling comprises disposing the anchor terminus through the aperture to form a compression fitting.

4. The method of claim 1, wherein the elongated tether comprises a retention end, the retention end comprising one or more retention apertures, each characterized by a retention-aperture diameter, and a retention terminus characterized by a retention diameter, the retention diameter being greater than the retention-aperture diameter.

5. The method of claim 4, further comprising coupling an object to the elongated tether by disposing the elongated tether around or through the object and disposing the retention terminus through one of the one or more retention apertures.

6. The method of claim 5, wherein the object comprises a pacifier, a toy, a cup, a stuffed animal or a marker.

7. The method of claim 1, wherein the crossbar comprises a shopping cart handle, a high chair safety bar, or a handle of an infant car seat or baby carrier.

8. A method comprising:
providing a flexible mat, the flexible mat having (i) a mat body characterized by a front side, a back side and a thickness; (ii) a plurality of anchors, each anchor comprising an anchor block having sloped faces extending from an apex to a base, an aperture extending through the anchor block from one sloped face to another and configured to receive a tether, and a suction cup; each anchor disposed through the thickness, such that its anchor block is on the front side and its suction cup extends from the back side;
wrapping the flexible mat around a crossbar associated with a seat for an infant or toddler, wherein the back side is adjacent a surface of the cross bar;
affixing at least one of the plurality of suction cups to another one of the suction cups;
providing a tether configured to secure an object; and
coupling the tether to one of the anchor blocks and securing an object to the tether.

9. The method of claim 8, wherein the object comprises a pacifier, a toy, a stuffed animal or a marker.

10. The method of claim 8, further comprising placing a toddler or infant in the seat.

11. The method of claim 10, further comprising providing the object to the toddler or infant to occupy him or her.

12. The method of claim 8, wherein wrapping the flexible mat around the crossbar comprises covering the surface, which surface would otherwise be contactable by the toddler or infant.

13. A method comprising:
providing a flexible mat, the flexible mat having (i) a mat body characterized by a front side, a back side and a thickness; (ii) a plurality of anchors, each anchor comprising an anchor block having sloped faces extending from an apex to a base, an aperture extending through the anchor block from one sloped face to another and configured for receiving a tether, and a suction cup; wherein each-anchor block is on the front side and each suction cup extends from the back side;
wrapping the flexible mat around a structural member, with the back side adjacent a surface of the structural member; and
affixing at least one of the plurality of suction cups to another one of the plurality of suction cups.

14. The method of claim 13, further comprising providing a tether that is configured to secure an object, and coupling the tether to one of the anchor blocks.

15. The method of claim 14, further comprising securing an object to the tether.

16. The method of claim 14, wherein the structural member is associated with a seat for a toddler or infant, and the method further comprises placing a toddler or infant in the seat.

17. The method of claim 16, wherein the object comprises a pacifier, a toy, a stuffed animal or a marker; and providing the tether comprises providing a means to occupy the toddler or infant.

18. The method of claim 16, wherein wrapping the flexible mat around the structural member comprises covering the surface, which surface would otherwise be contactable by the toddler or infant.

19. The method of claim 14, wherein the tether comprises an anchor end, the anchor end having an anchor terminus characterized by an anchor diameter that is greater than a diameter of the aperture, the elongated tether comprising a compressible material.

20. The method of claim 14, wherein the tether comprises a retention end, the retention end comprising one or more retention apertures, each characterized by a retention-aperture diameter, and a retention terminus characterized by a retention diameter, the retention diameter being greater than the retention-aperture diameter.

21. The method of claim 13, wherein the structural member comprises an appliance handle, a stroller component, a furniture component or a bathtub railing.

* * * * *